L. F. DOUGLASS.
CAMERA.
APPLICATION FILED JUNE 30, 1916.
1,253,796. Patented Jan. 15, 1918.
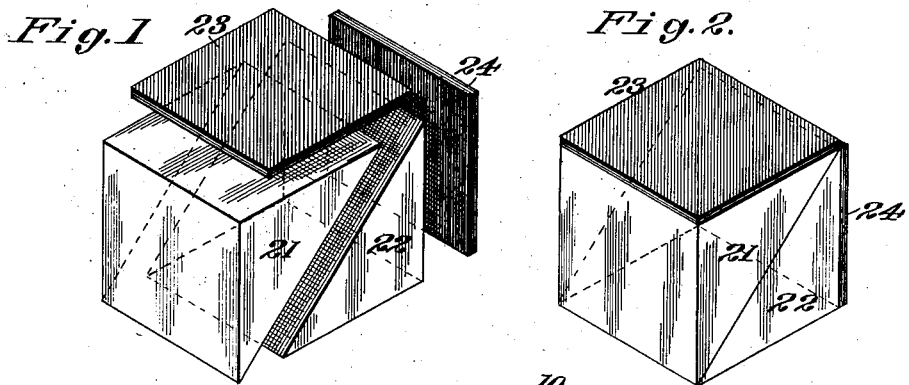
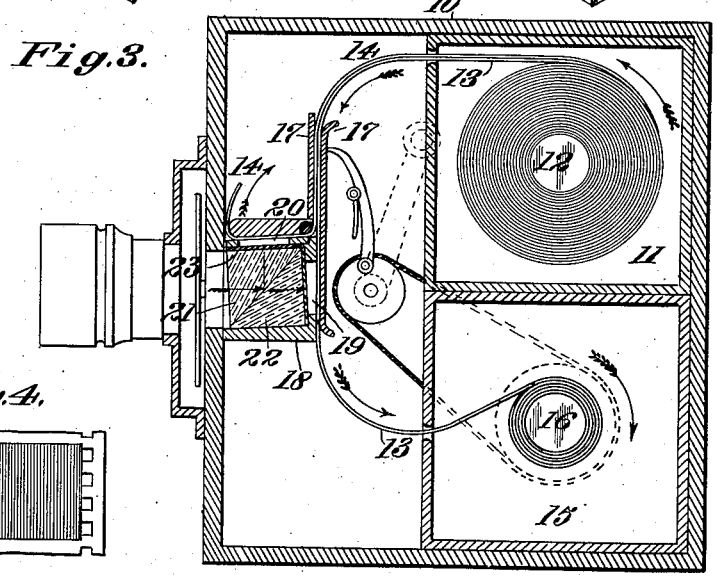
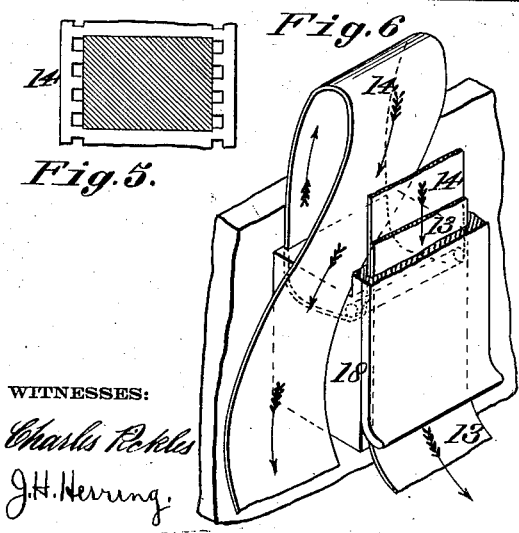
WITNESSES:
Charles Rekls
J.H. Herring
INVENTOR
Leon F. Douglass
BY
Strong & Townsend
ATTORNEYS

UNITED STATES PATENT OFFICE.

LEON F. DOUGLASS, OF SAN RAFAEL, CALIFORNIA.

CAMERA.

1,253,796.  Specification of Letters Patent.  Patented Jan. 15, 1918.

Application filed June 30, 1916. Serial No. 106,870.

*To all whom it may concern:*

Be it known that I, LEON F. DOUGLASS, a citizen of the United States, residing at San Rafael, in the county of Marin and State of California, have invented new and useful Improvements in Cameras, of which the following is a specification.

This invention relates to cameras of the type shown and described in my co-pending application, Serial No. 81,659, filed March 2, 1916, for use in producing duplicate exposures from a single objective and particularly adapted for color photography.

In my former application I have shown a camera employing a light dividing member consisting of a transparent mirror arranged diagonally in the lens barrel, whereby a portion of the light rays is reflected onto a film at right angles to the axis of the lens barrel and the remaining portion allowed to pass through the mirror in a straight line onto a film at the rear end of the barrel. Thereby identical images are projected simultaneously upon separate films so that later the two films may be differently colored and united with corresponding images in register, whereby to reproduce the photographed objects in their natural colors.

With a light dividing member having its reflecting surface at one side, I find it difficult to obtain light rays of equal intensity upon both films, this objection manifesting itself in a weakening of the reflected light rays as compared with the transmitted light rays. This difficulty can be explained by the fact that the light after meeting the surface of the mirror, must pass in one direction through the glass while in the other direction it passes directly through the air. Thus, suppose that the reflection is from the back of the dividing member, the transmitted portion of the light is then free to pass directly to the film while the reflected portion must return through the glass. Thus, there will be a loss of efficiency in the reflected rays and considerable internal reflection may occur when the returning rays strike the front surface of the glass and are again reflected. Multiple images due to successive reflection, may also occur to further impair the efficiency of the dividing member.

I overcome these objections in the present invention, wherein I utilize a right angle prism so arranged that the light rays enter at approximately right angles to one of the side faces of the prism and strike the hypotenuse surface at such an angle as to afford substantially equal reflection and emergence. Thence, in order to correct any refraction of the transmitted rays and to obtain the same intensity of light rays in both directions, I arrange a second right angle prism engaging the hypotenuse of the first prism, thus forming a glass cube with a plane surface running diagonally therethrough.

One form which my invention may assume is exemplified in the following description and illustrated in the accompanying drawings in which—

Figure 1 shows a perspective view of my light dividing member with the prisms and color screens constituting the same, separated.

Fig. 2 shows a similar view of the same with the parts in joined position.

Fig. 3 shows a sectional view of a camera embodying my invention.

Figs. 4 and 5 show details of the films after treatment.

Fig. 6 shows a perspective view of the films and guiding means therefor, and

Fig. 7 shows a detailed sectional view of a lens barrel equipped with my light dividing member.

In the drawings, I have shown for illustrative purposes a motion picture camera, although my invention may obviously be used in connection with still cameras. This camera comprises a box 10, having a compartment 11 containing a reel 12 upon which two films 13 and 14 are wound, said box also containing a compartment 15 within which is a double reel 16, upon which the two films are separately wound after exposure. The two films 13 and 14 lying one upon the other, as they are drawn from the reel 12, pass between suitable guides 17 toward the lens barrel 18, where they separate, the lower film 13 passing directly down over an opening 19 at the rear end of the barrel, while the other film 14 is diverted at right angles and crosses an opening 20 in one side of the barrel.

The films 13 and 14 must receive approximately equal intensities of light for simultaneous exposure. For this purpose I have devised a light dividing member, which, as shown, comprises a right angle isosceles prism 21 of clear glass arranged in the lens barrel, with its altitude surface presented toward the lens.

When a luminous ray meets a polished surface, it is reflected in accordance with the well-known law, namely, the angle of reflection is equal to the angle of incidence. If it is desired to obtain total reflection in a right angle prism, it is necessary that the angle of incidence, usually computed as the angle between the incident ray and a normal line drawn perpendicular to the reflecting surface or hypotenuse of the prism, be greater than the critical or limiting angle of glass, somewhere in the neighborhood of 42°. An angle of incidence less than that will result in refraction and emergence of the ray. Somewhere at this point a condition will be present where the reflected and transmitted rays will be equal. Accordingly, in order to obtain this result, I arrange the prism 21 so that the angle of incidence is approximately 42°, whereby to reflect a portion of the light rays upwardly through the prism and out through the base surface thereof and to transmit an equal portion of the light rays beyond the hypotenuse. In order to correct the refraction of the transmitted rays and obtain the same intensity of light in both directions, I arrange a second right angle prism 22, with its hypotenuse engaging the hypotenuse of the first prism, thus forming a slightly tilted cube with a smooth or polished surface running diagonally therethrough. Thereby the transmitted rays are passed through the second prism and emerge from the rear or altitude surface thereof without refraction. The reflected rays and the transmitted rays having passed through the same thicknesses of glass from the dividing line, will, if equally divided at the outset, emerge from the faces of the prisms at substantially equal intensities. In other words, by locating a semi-reflecting surface in the exact center of the cube, I overcome the many objections present where the reflecting surface is at one side or other of the glass.

A colored screen 23, say green, is arranged on the base of the prism 21 so that only the green rays are transmitted to the film 14, while on the rear face or altitude of the prism 22, I arrange a differently colored screen 24, say red, whereby rays of this color only are transmitted to the film. Having thus exposed the films, which are the ordinary orthochromatic films of commerce, they are then removed to the dark room and developed and treated preferably by the Hess-Ives process which briefly involves the development of the films and then by a hot water bath floating off the unneeded portion of the emulsion and fixing the films; the films thus developed and fixed each bear comparatively faint images but of sufficient density when brought together and treated by my process. After fixing and development the films are colored or dyed in complementary colors, as for instance, the one exposed to red rays is colored green while the one exposed to green rays is colored red. Manifestly if desired, this coloring or dyeing process may take place during development or preceding or during, or following fixing. When pasted together with the images in exact register, a composite film in natural colors is formed.

Preferably the triangular faces of both prisms and the base of the prism 22 are "blanked" or left unpolished, and the remaining faces, including the hypotenuse of both, are polished in order to facilitate the transmission and reflection of the light rays.

With the present light dividing means, there is no undue loss of the intensity of the light, such as is present where successive internal reflections occur, and consequently motion pictures may be taken much faster than otherwise and even snap-shots may be taken. Furthermore, there is always an even distribution of light rays, and multiple images are prevented, which have the effect of showing objects out of their proper focus.

While I have shown and described herein but one form of my invention, it will be understood, nevertheless, that the same is susceptible of modification, and therefore various changes in the arrangement and location of the different parts may be employed, without departing from the spirit thereof, as disclosed in the appended claims.

Having thus described my invention, what I claim and desire to secure by Letters Patent is—

1. In a camera having a single objective, a plurality of flexible films, a part of each being angularly disposed with respect to the other and adapted for simultaneous exposure, a light dividing member for said camera comprising means to reflect the light to one film and transmit it to the other in portions of approximately equal intensity, and means for intermittently moving the films across their respective light openings.

2. In a camera, a light dividing member comprising a surface to divide the light rays into portions traveling in different directions, means for maintaining said portions at approximately equal intensities and delivering them to film surfaces substantially without further changing their directions, and means for intermittently moving the film surfaces across the paths of light.

3. In a camera, a light dividing member comprising a surface to reflect a portion of the light in one direction and transmit another portion in a different direction, means to maintain the two portions at approximately equal intensities and deliver them from said surface to film surfaces in right angular directions, and means for intermittently moving the film surfaces across the paths of light.

4. In a camera, a plurality of films angularly disposed with respect to each other, a light dividing member comprising a right angle prism, having its hypotenuse surface turned away from the objective and so positioned as to internally reflect a portion of the light to one film in one direction and transmit the remaining portion in a different direction, and a second prism coöperating with the first to receive the transmitted light and deliver it to another film in a direction at right angles to the reflected rays.

5. In a camera, two films angularly disposed with respect to each other, a light dividing member comprising a right angle prism having its hypotenuse surface turned away from the objective and so positioned as to internally reflect a portion of the light to one film in one direction and transmit the remaining portion in a different direction and a second prism coöperating with the first to correct the refraction of the transmitted light and deliver it to the other film in a direction at right angles to the reflected light.

6. In a camera, a light dividing member comprising a right angle prism, having its hypotenuse surface turned away from the objective and so positioned as to reflect a portion of the light in one direction and transmit the remaining portion in a different direction, a second prism coöperating with the first to receive the transmitted light and deliver it in a direction at right angles to the reflected rays, a screen of one color near the emergent face of the first prism and a screen of a different color near the emergent face of the second prism.

7. In a camera, a light dividing member comprising a cubical glass made up of two isosceles right angle prisms, the hypotenuse of which form a diagonal surface in the cube, whereby light is reflected and transmitted in substantially equal portions in right angular directions, and screens of different colors near the emergent faces of said cube.

8. In a camera, a light dividing member comprising a cubical glass made up of two isosceles right angle prisms, the hypotenuse of which are in contact and form diagonal surfaces in the cube, whereby light is reflected and transmitted in approximately equal portions in right angular directions, said cube being tilted slightly to lessen the angle of the incident rays with respect to the normal of the diagonal surfaces.

In testimony whereof I have hereunto set my hand in the presence of two subscribing witnesses.

LEON F. DOUGLASS.

Witnesses:
JOHN H. ELFERING,
PETER BANGALUPI, Jr.